INVENTOR.
Jerome H. Lemelson

3,084,926
COMPRESSION SPRINGS
Jerome H. Lemelson, 43A Garfield Apts., Metuchen, N.J.
Filed July 10, 1957, Ser. No. 671,038
4 Claims. (Cl. 267—1)

This invention relates to molded articles of manufacture and in particular, to the manufacture of articles requiring novel or complex molds.

It is a primary object of this invention to provide improved articles of manufacture, having complex shape, and means for producing said articles from the molten state.

Another object is to provide improved means for forming articles of manufacture of complex shape at a lower cost and with the utilization of less labor than heretofore possible.

Still another object is to provide improved articles of manufacture of complex shape fabricated from the molten state by molding means.

Another object is to provide an improved type of coil spring fabricated by injection molding without the need for utilizing hot forming or cold rolling equipment.

Another object is to provide improved means of making improved compression springs of moldable plastic materials.

Yet another object is to provide improved coil springs having means formed integral with said springs at either or both ends for securing it to other members, for support thereon or to be held apart thereby.

Another object is to provide a coil form or springs with means located between the ends of said forms for securing objects thereto.

Further objects and advantages will be apparent from the following description and drawings.

Figure 1:
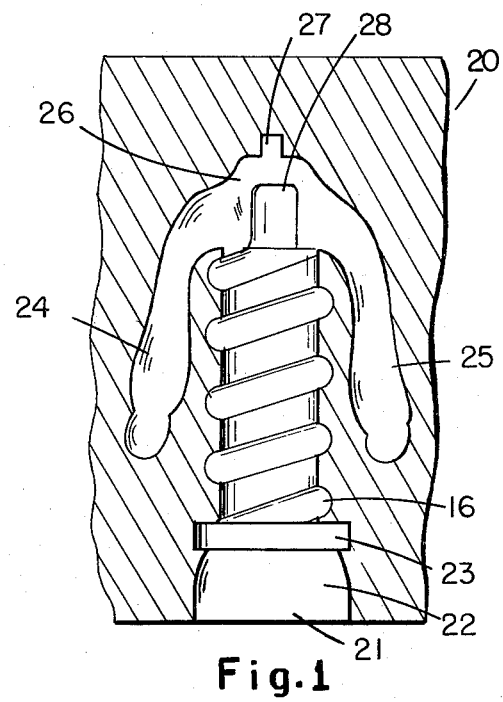
FIG. 1 is a partial view of a face of a mold half section with a cavity shaped to provide a spring coil having a fitting with lateral projections on one end and a fitting of larger diameter than the coil at the other end.

FIG. 1 illustrates a mold half section 20 for the molding therein of a helical coil form or spring having end fittings or parts integrally formed on said coil section. In FIG. 1, lateral cavity sections 24 and 25 extend from a central cavity 26 at the upper end of the coil cavities 16 and are shaped to provide lateral appendages such as the arms of a figurine molded integrally with the central coil, when said mold half 20 is assembled with a mold half section and a central cylindrical or conical nose or pin comprising part of the mold and defining the inside wall of the cavity. The notation 28 refers to a riser or projecting ridge extending partly through the cavity section 26 having its upper surface in the plane of the face of 20. The riser 28 is provided to make part of the upper fitting 26 hollow when molded thereby lightening and reducing the material needed in said fitting. The notation 27 refers to a small semi-cylindrical cavity projecting upward from section 26 and may be utilized for providing a pin-like projection for securing another member to the fitting or molded section formed in 26. The lower end of the mold cavity 21 of FIG. 1 has a section 22 of greater diameter than the centrally located cavity section which, when the central nose or pin is assembled with 20 and a matched half section, forms an annular cavity for the molding of a hollow shell integral with the coil form. Notation 23 refers to a cavity section between 22 and 13' which is of greater diameter than 22 and is utilized to provide an increase in the cross-section of the molding between the coil form and the section formed in cavity 22.

Figure 3:
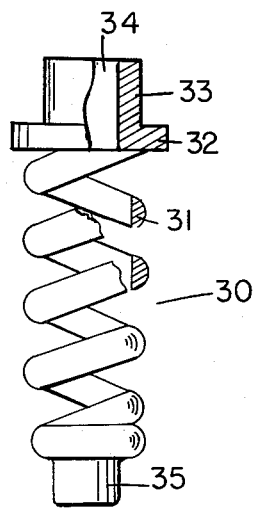
FIG. 3 shows in partial section, another spring design having end fitting integrally molded at the ends of said spring for securing it to other members.
Figure 2:
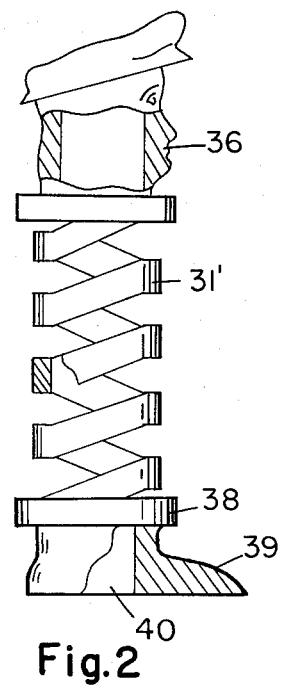
FIG. 2 shows, in partial section, a helical spring made by molding a hardenable liquid and having figurine end fittings.

FIGS. 2 and 3 illustrate a number of modified coil forms or springs formed in molds assembled of sections having cavities and formations in accordance with the general teachings of the embodiment of FIG. 1. In FIG. 2 is shown a unitary molding comprising a centrally located helical coil 31' having a helical or spiralling element of rectangular cross-section as shown with novel integral formations at each end thereof and formed integrally therewith. Formed on the upper end of coil 31' is an upper torso or head section 36 with a cavity 37 therein provided by riser sections of the mold such as 28 of FIG. 1. The lower end of 31' is formed with a hollow stand or leg 39. A cavity 40 is formed therethrough by the central nose mold section which provides the inside surface of the coil 31'. The diameter "D" of 40 is thus equivalent to the diameter of the pin or nose of the mold.

FIG. 3 shows a coil form similar to that of FIG. 2 with male and female end fittings 35 and 33 provided respectively at the bottom and top ends of the central coil section 31 of the form 30. The element making up the coil 31 is shown as semi-circular in cross-section. The bottom fitting 35 is a cylinder and is adapted to frictionally engage the walls of a hole in a member to be assembled therewith. An opening 34 through the wall of the upper fitting 33 is cylindrically shaped and is adapted to receive and frictionally engage a projection such as 35 from a member to be assembled therewith.

The detailed description herein made is not to be considered restrictive of the invention as it is obvious that various minor changes in design may be effected without departing from the spirit of the invention.

I claim:

1. A compression spring member of unitary structure, said spring member being injection molded of thermoplastic material and having a central deformable coil portion of spiral shape, end fitting portions of different shape than the convolutions of the coil portion and integrally molded at both ends of said central coil portion, one of said end fitting portions being substantially cylindrically shaped and having portions of greater external diameter than the outside diameter of the convolutions of the coil portion, the inside cylindrical surface of said end fitting adapted for frictionally retaining said spring member by engagement against the outside surface of a further member.

2. A coil spring member of unitary structure, said spring member being molded of thermoplastic material capable of deformation and having an elastic memory for returning said spring member to its shape as molded after being deflected, said spring member having a deformable spring body including an elongated wire-like spirally extending coil portion, said coil portion having attachment fittings of irregular shape integrally molded thereon at each end thereof, at least one of said fittings including a pin-like projection adapted to be exteriorly engaged in assembly with another member, the other fitting portion having a cylindrical bore for retaining a further member therein, at least one of said fitting portions having an integral formation extending laterally beyond the envelope defining the exterior surface of said coil portion.

3. A coil spring member of unitary structure, said spring member being molded of thermoplastic material capable of deformation and having an elastic memory for returning said spring member to its shape as molded after being deflected, said spring member having a deformable spring body including an elongated wire-like spirally extending coil portion, said coil portion having at least part of a body of a figurine integrally molded at one end thereof which body part includes at least one portion extending laterally beyond the envelope defining the exterior surfaces of said coil portion and the other end of said coil portion having a second portion of said figurine body integrally molded thereon.

4. A coil spring in accordance with claim 3, one of said body portions having a plurality of limbs extending laterally beyond the envelope defining the exterior surfaces of said coil portion so as to substantially overhang said coil portion.

References Cited in the file of this patent

UNITED STATES PATENTS

| | | | |
|---|---|---|---|
| Re. 14,287 | Knudsen | Apr. 17, | 1917 |
| 380,184 | Celce | Mar. 27, | 1888 |
| 645,452 | Bolte | Mar. 13, | 1900 |
| 646,413 | Collet | Apr. 3, | 1900 |
| 2,275,526 | Hill | Mar. 10, | 1942 |
| 2,310,080 | Hill | Feb. 2, | 1943 |
| 2,323,286 | Ward | June 29, | 1943 |
| 2,479,695 | Morin | Aug. 23, | 1949 |
| 2,747,859 | Rager | May 29, | 1956 |
| 2,875,779 | Campbell | Mar. 3, | 1959 |
| 2,903,242 | Bodine | Sept. 8, | 1959 |